US012517810B2

(12) United States Patent
Rihani

(10) Patent No.: US 12,517,810 B2
(45) Date of Patent: Jan. 6, 2026

(54) REVERSE TESTING STRATEGIES DESIGNED FOR BLACK-BOX AND EXPLORATORY TESTING

(71) Applicant: SAP SE, Walldorf (DE)

(72) Inventor: Lamine Rihani, Sartrouville (FR)

(73) Assignee: SAP SE, Walldorf (DE)

( * ) Notice: Subject to any disclaimer, the term of this patent is extended or adjusted under 35 U.S.C. 154(b) by 170 days.

(21) Appl. No.: 18/366,900

(22) Filed: Aug. 8, 2023

(65) Prior Publication Data
US 2025/0053503 A1  Feb. 13, 2025

(51) Int. Cl.
*G06F 16/215* (2019.01)
*G06F 9/44* (2018.01)
*G06F 11/36* (2025.01)
*G06F 11/3668* (2025.01)
*G06F 16/25* (2019.01)

(52) U.S. Cl.
CPC ...... *G06F 11/3688* (2013.01); *G06F 11/3684* (2013.01); *G06F 11/36* (2013.01); *G06F 16/215* (2019.01); *G06F 16/254* (2019.01)

(58) Field of Classification Search
CPC .. G06F 11/3688; G06F 11/3684; G06F 11/36; G06F 16/215; G06F 16/254
See application file for complete search history.

(56) References Cited

U.S. PATENT DOCUMENTS

| | | | |
|---|---|---|---|
| 11,182,279 B1 * | 11/2021 | Hicks | G06F 11/3692 |
| 2006/0010426 A1 * | 1/2006 | Lewis | G06F 11/3684 717/124 |
| 2006/0230320 A1 * | 10/2006 | Salvador | G06F 11/3684 714/38.1 |
| 2009/0205047 A1 * | 8/2009 | Podjarny | G06F 21/577 726/25 |
| 2015/0169434 A1 * | 6/2015 | De Angelis | G06F 11/3688 717/124 |

(Continued)

OTHER PUBLICATIONS

Dianxiang Xu et al., An Automated Test Generation Technique for Software Quality Assurance, Mar. 2015, [Retrieved on Jul. 22, 2025]. Retrieved from the internet: <URL: https://ieeexplore.ieee.org/stamp/stamp.jsp?tp=&arnumber=6915770> 22 Pages (247-268) (Year: 2015).*

(Continued)

*Primary Examiner* — Anibal Riveracruz
(74) *Attorney, Agent, or Firm* — Fish & Richardson P.C.

(57) ABSTRACT

Methods, software, and systems for generating intelligent data reports include obtaining initial test outputs from test case scenarios defined for the data processing application. Instructions are provided to a user to execute user-defined tests and to obtain a particular test output from the test outputs. The instructions are provided without providing instructions to the user for input values for parameters to be used for obtaining the particular test outputs. The user-defined tests are performed at the data processing application when associated with a test data source. Data is obtained from the executed user-defined tests at the data processing application. A data analysis is performed over the obtained data to evaluate quality of executions of services provided by the data processing application. A quality status is obtained for the services provided by the data processing application.

20 Claims, 6 Drawing Sheets

(56) References Cited

U.S. PATENT DOCUMENTS

| | | | |
|---|---|---|---|
| 2017/0161180 A1* | 6/2017 | Raghavan | G06F 11/3684 |
| 2023/0205674 A1* | 6/2023 | Sahu | G06N 20/00 |
| | | | 717/125 |
| 2024/0281419 A1* | 8/2024 | Alfaras | G06F 16/215 |

OTHER PUBLICATIONS

U.S. Appl. No. 18/347,734, filed Jul. 6, 2023, Rihani.

Black, "Chapter 18: Orthogonal Arrays and All Pairs" Pragmatic software testing: Becoming an effective and efficient test professional, John Wiley & Sons, Apr. 2016, 239-260.

* cited by examiner

| | Data Providers | Supported Operators | All Member Selection |
|---|---|---|---|
| 1 | Data Provider X | None | True |
| 2 | Data Provider Y | Equal | False |
| 3 | Data Provider X | Greater than | False |
| 4 | Data Provider Y | Less than | False |
| 5 | Data Provider Y | Exclude | False |
| 6 | Data Provider Z | Exclude | False |
| 7 | Data Provider Y | None | True |
| 8 | Data Provider X | Include | False |
| 9 | Data Provider Z | Greater than | False |
| 10 | Data Provider X | Less than | False |
| 11 | Data Provider Y | Greater than | False |
| 12 | Data Provider Z | Include | False |
| 13 | Web Services | Includes | False |
| 14 | Web Services | Greater than | False |
| 15 | Data Provider X | Equal | False |
| 16 | Web Services | Exclude | False |
| 17 | Web Services | Less than | False |
| 18 | Web Services | Equal | False |
| 19 | Web Services | None | True |
| 20 | Data Provider Z | None | True |
| 21 | Data Provider Z | Less than | False |
| 22 | Web Services | Exclude | False |
| 23 | Data Provider Z | Equal | False |
| 24 | Data Provider Y | Include | False |

REVERSE TESTING STRATEGIES DESIGNED FOR BLACK-BOX AND EXPLORATORY TESTING

TECHNICAL FIELD

The present disclosure relates to computer-implemented methods, software, and systems for managing design and testing of software solutions.

BACKGROUND

Software complexity is increasing and causes changes to lifecycle management and maintenance of software applications, databases, and platform systems. In software development, testing usually is associated with complicated system and solutions that require time and resources for ensuring high quality of the results. Usually, quality engineers are supposed to test complicated software with a great variety of input and output values, unobvious correlation between parameters, selected options, and execution flows. Comprehensive testing of a single module can barely discover all the issues. However, testing every possible input combination is in real-time systems can lead to test suites with a lot of test cases which need to be designed, documented, and executed. That can be a cumbersome task that is associated with a lot of resources, time investment, and is error prone.

SUMMARY

Implementations of the present disclosure are generally directed to a computer-implemented method for executing reverse testing strategies designed for black-box and/or exploratory testing.

One example method may include operations such as obtaining initial test outputs from test case scenarios defined for the data processing application, wherein the test case scenarios are associated with a combination of values for parameters provided for user selection at a user interface of the data processing application, wherein a test output comprises an output data set provided based on a particular combination of values for the parameters at the user interface; providing instructions to a user to execute user-defined tests to obtain a particular test output from the test outputs, wherein the instructions are provided without providing instructions to the user for input values for parameters to be used for obtaining the particular test output, wherein the execution of the user-defined tests is performed at the data processing application when associated with a test data source; obtaining data from the executed user-defined tests at the data processing application, wherein the obtained data includes input data provided for processing at the data processing application as part of the user-defined tests and output data obtained based on the processing when invoking data from the test data source based on the user-defined tests; performing data analysis over the obtained data to evaluate quality of executions of services provided by the data processing application; and generating a quality status for the services provided by the data processing application, wherein the quality status is generated to include at least one more further test input for a test case scenario to be executed over the data processing application.

Particular embodiments of the subject matter described in this specification can be implemented to realize one or more of the following advantages. For example, using reverse testing strategies designed during a development of an application or a software solution can promote high test coverage since the testing can be extended with test cases for the input that are not predesigned but rather depend on the user specifics and practices. The reverse testing strategies can be implemented as part of a development process to support definition of new features for an application, to improve the performance of the application, or to modify the functionality to address identified issues (e.g., security breaches, risk of data leakage, authentication and authorization issues, other). Also, the reverse testing strategies can be incorporated in the testing stage of an application that can complement execution of other tests (e.g., usability test, user tests, other) to identify issues in the functionality of the application and remedy those.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description, drawings, and the claims.

BRIEF DESCRIPTION OF DRAWINGS

FIG. 2B is a block diagram of an example set of test cases defined for a data processing application associated with a set of data providers, supporting a set of operations, and including Boolean values for parameters provided as input in accordance with implementations of the present disclosure.

DETAILED DESCRIPTION

Figure 1:
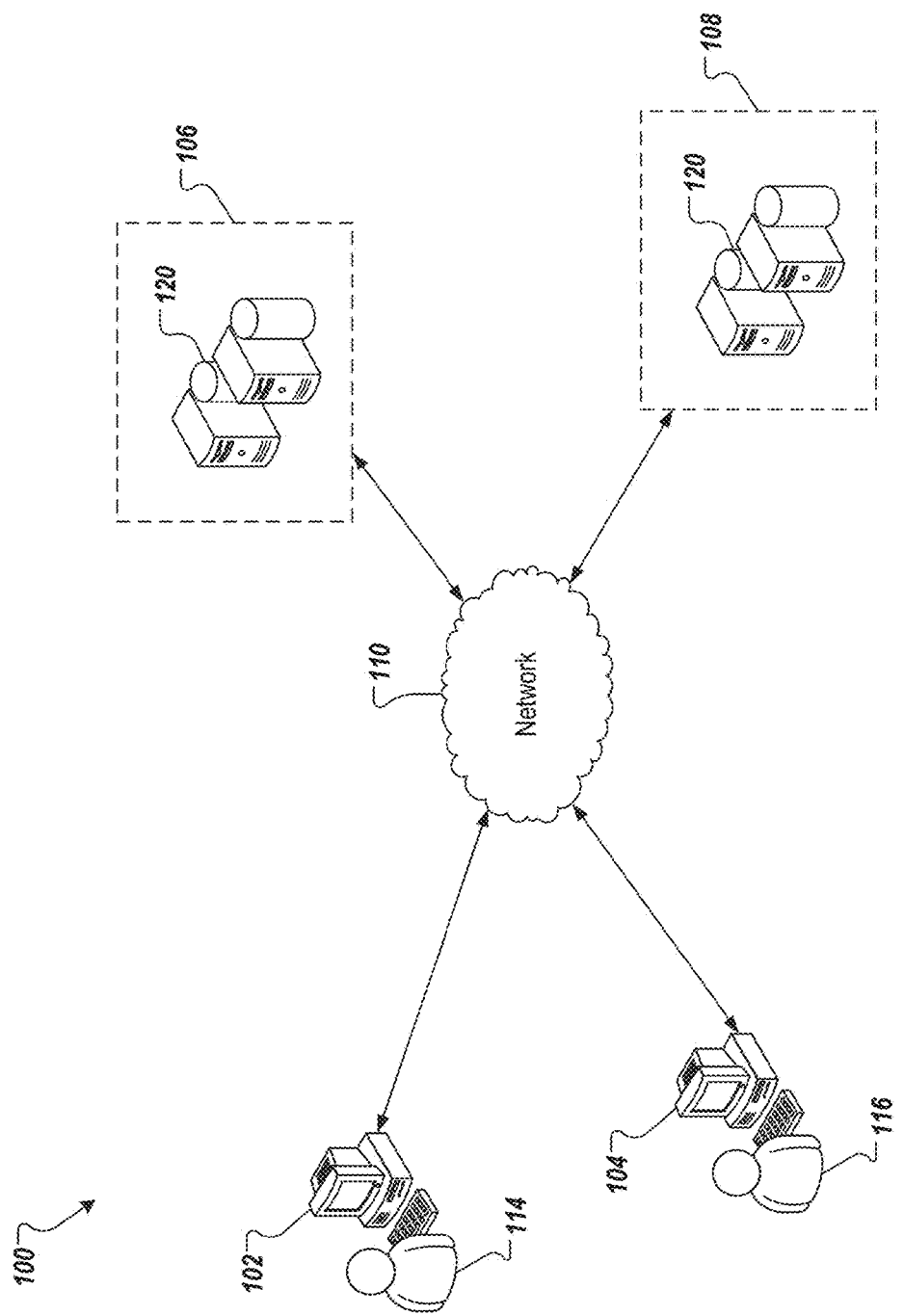
FIG. 1 is a block diagram depicting an example computer-implemented system that can execute implementations of the present disclosure in accordance with implementations of the present disclosure.

The present disclosure describes various tools and techniques for implementing reverse testing strategies designed for black-box and/or exploratory testing.

In software development, an application's development lifecycle includes various stages where development and testing stages can be performed iteratively for two or more times to verify and potentially improve the quality of the final product. In some cases, a software application can be a solution that provides functionality for data processing and obtains input to generate output. For example, an analytical software tool such as a dashboard or a reporting tool can obtain input from a user for various parameters and generate an output data set, such as a report, graph, or other output data representation. When testing such an application, the application can be tested by using black-box testing techniques that involve testing an application without prior knowledge of its internal functionality, where a tester is provided with test input and an output from the application is observed to determine whether the application functions according to its specification (e.g., functionality is executed without errors, no miscalculations, proper data invocation request, etc.).

In some instances, a data processing application can be an application that supports execution of data operations based on user input to select data from one or more data sources. According to studies, most defects (errors or issues) that can be identified in the functioning of such a data processing application can be triggered by a single input or an interaction between two parameters. This is considered as a fundamental basis to justify the usage of pairwise testing as it is expected to be both efficient and relevant. In some cases, pairwise testing can be applied that can focus on just two input parameters at a time. However, generally, any number of N input parameters can be defined as a focus for defining test cases and using those cases to evaluate the quality of an application.

In some instances, during the testing stage that includes black-box testing, an N-wise testing technique can be used to optimize a number of generated test cases that are needed to provide a threshold number of test case coverage for the application. The N-wise testing technique is a design technique that improves the test approach by generating a minimum number of test case covering all or most of input parameter combinations, as most of the defects within an application (e.g., a service application obtaining input and providing output such as an analytical or dashboard application) are provoked by one or two input parameters interaction (a single input value or a combination of two input value for parameter(s) from the parameters associated with user input).

In accordance with the present application, a reverse testing strategy approach is described that uses the N-wise design technique on the output parameters and produce the test cases that are user-defined and can lead to desired result such as more comprehensive testing of the application, identifying issues associated with specific instances of data providers or configurations for the data source (e.g., localization specifics for data format, language, style, syntax, etc.). As described, such reverse testing strategies can provide a more customer-focused test case designs and can help to increase the test coverage of an existing test suite (including test case scenarios) by adding new test cases based on an end-user input. The end-user expectation for performance and functioning of a service can be applied to generate test cases and test input based on an expectation to generate a given test output. The user can define test cases with suggestions for input that he expects to yield the test output as requested. The execution of the user-defined test cases can be monitored, and data can be collected to identify expectation for functionality from the application and/or identify issues (e.g., security breaches), or errors in the service execution, among other quality defects that can affect the quality status of the application.

In some instances, a reverse N-wise testing technique can be implemented as part of an exploration testing phase which ensures that all possible combinations of the values of N parameters are covered within a test suite. For example, the number N of parameters used for the combination can be defined as a positive integer in the range $2 \leq N \leq p$ and p can represent the total number of parameters (e.g., all input parameters that can be exposed by an application to request an execution result) of the tested system.

Based on implementations of the present disclosure, the testing based on the reverse testing strategy can guarantee that all possible N-tuples that can be defined with an N-wise testing technique are covered in the test suite at least once. Further, the number of parameters to define combinations N can vary but cannot exceed the total number of parameters.

FIG. 1 is a block diagram depicting an example computer-implemented system 100 that can execute implementations of the present disclosure in accordance with implementations of the present disclosure. In the depicted example, the example system 100 includes a client device 102, a client device 104, a network 110, a computing environment 106, and a computing environment 108. The computing environment(s) 106 and/or 108 can be cloud computing environments that can include one or more server devices and databases (for example, processors, memory). In the depicted example, a user 114 interacts with the client device 102, and a user 116 interacts with the client device 104.

In some examples, the client device 102 and/or the client device 104 can communicate with the environment 106 and/or environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (for example, PSTN), or an appropriate combination thereof connecting any number of communication devices, mobile computing devices, fixed computing devices and server systems.

In some implementations, the environment 106 (and/or the environment 108) can include at least one server and at least one data store 120. In the example of FIG. 1, the environment 106 is intended to represent various forms of servers including, but not limited to, a web server, an application server, a proxy server, a network server, and/or a server pool. In general, server systems accept requests for application services and provide such services to any number of client devices (for example, the client device 102 over the network 110).

In accordance with implementations of the present disclosure, and as noted above, the environments 106 and/or the environment 108 can host applications and databases running on the host infrastructure. In some instances, the environment 106 can include multiple cluster nodes that can represent physical or virtual machines that can represent web node clusters. A hosted application and/or service can run on virtual machines (VMs) hosted on cloud infrastructure.

In some instances, the environment 106 and/or the environment 108 can provide infrastructure for hosting a data processing application that can be tested and further developed (e.g., in cases where testing is defined as part of the development, or the testing phase can provide input for further development tasks) in accordance with the present disclosure.

Figure 2A:
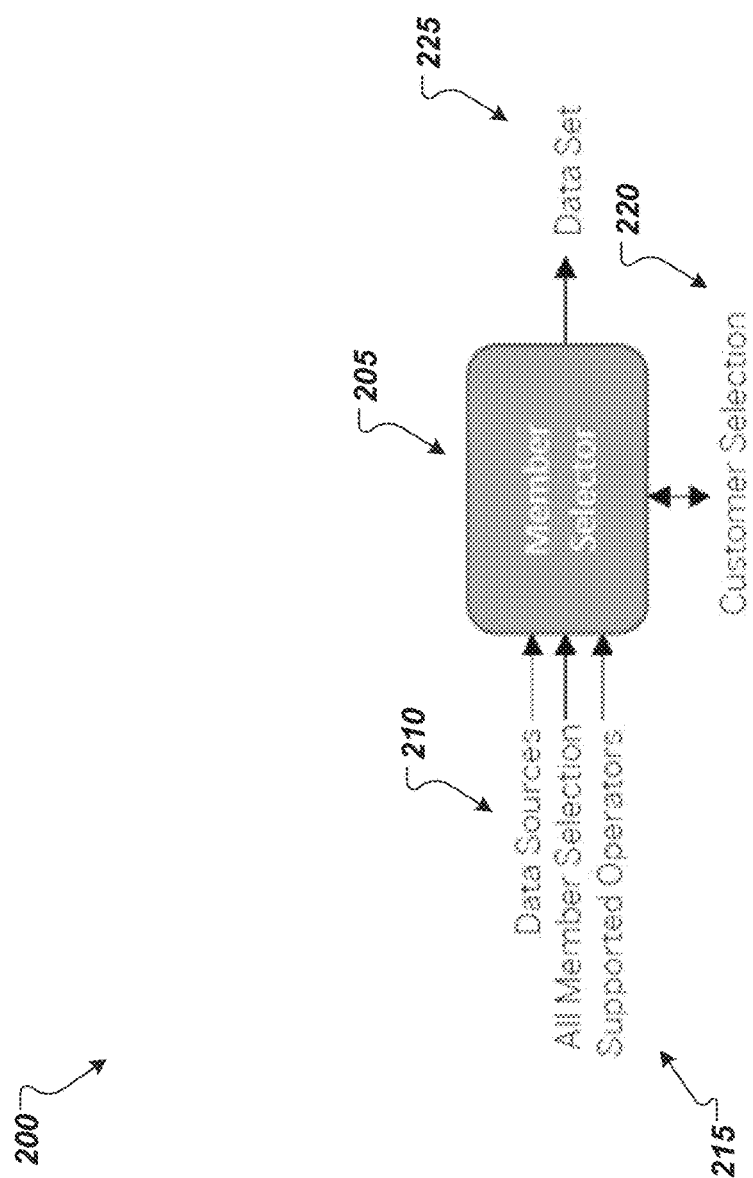
FIG. 2A is a block diagram of an example computing environment including a data processing application providing services requested based on user interaction identifying input data that is obtained from data sources and providing output sets in accordance with implementations of the present disclosure.

In some instances, the environments 106 or 108 can host a data processing application, such as the data processing application 205 of FIG. 2A. The data processing application can include one or more member selectors to invoke data from data source(s). For example, the data processing application can provide a user interface where a user can provide input including input values for parameters, supported operators (e.g., for comparison, for computations, etc.), identification of data providers, or other input to generate a data set as an output. In some instances, such data processing application can be associated with a development, upgrade or update procedure that can relate to testing of the functionality of the data processing application. The testing of such data processing application can be performed according to the reverse testing techniques as described in the present application. The executed user-defined tests based on test instructions providing instructions for generating test output can be performed at the data processing application and the underlying environment or an associated environment can collect data for the executed tests. The collected data can be stored and analyzed to determine the quality status of the data processing application. For example, based on the testing, new features for the data processing application can be defined, or old features can be updated or modified, among other example development tasks or administrative tasks that can provide the application in an expected quality status (e.g., according to a specification requirement).

In some implementations, the data processing application can be a report generation, where when a user selects a data field from a data set (e.g., the data field is mapped to a model entity of a data model defining the data set) through a query panel, the data processing application can perform data processing tasks (e.g., can obtain, aggregate, filter, analyze data associated with the selected data field) to provide an output (e.g., a report).

FIG. 2A is a block diagram of an example computing environment 200 including a data processing application 205. The data processing application 205 as discussed in relation to FIG. 1 can include member selectors 205 that are associated with particular parameters (such as parameters of a data model), and based on a user selection 220 can invoke data from a data source 210 (or more data sources) that matches an input value (e.g., a selection of a product from a drop-down menu or list) to provide a data set 225 as a result.

In some instances, when the data processing application 205 is developed and tested, a user (e.g., a quality engineer) can execute black-box testing of the application 205 by inputting values from data sources 210, apply filtering by defining all member selection, and use supported operators (215), thus to generate and observe the output to determine whether it matches an expected result. In some cases, the data processing application 205 can include a dialog box that allows a user to select a value within a provided list. In some instances, if a test suite is defined for the data processing application 205, the tests in the test suite can be defined according to the N-wise design technique.

In some cases, the N-wise technique can be defined to analyze the input parameters of the data processing application 205 and to create the equivalence classes to build an N-wise model based on the following input as presented at Table 1 below.

TABLE 1

Data Provider = {SQL Server, Hana, BW, Web Service}
Supported Operators = {Equal, greater than, less than, include, exclude, none}
All Member = {True, false}

In some cases, constraints for the definition of test cases (based on limitations of the functionality of the application) can be defined as shown in Table 2 below:

TABLE 2

If All Member = True, then Supported Operators = None
If Supported Operators = None, then All Member = True If it is desired to test all possible valid combinations, it can be computed that the number of valid test cases combinations equals 48 (4×6×2). By removing the invalid combinations using the described constraints, the number of possible combinations falls to 38 valid combinations. In the case that a 2-wise test technique is used to define combinations for test, this is the number of valid and possible pairs of values of every two parameters.

Using the N-wise test design technique (with N=2), a test suite 260 as shown on FIG. 2B can be generated for the above definition of parameters at Table 1 and the constraints at Table 2. The number of possible tests generated by the 2-wise design technique is 24, where the number of possible tests is the total number of different valid combinations of values that can be assigned to the parameters in the parameter definition. This number grows rapidly as more parameters and values are added to the parameter definition. For parameter definitions with many parameters and values, this number might be extremely large, or the calculation of the number might consume large amount of resources or even result in a time out for the computation.

In software testing, the definition of a test suite can be associated with a recommended threshold value for the percentage of coverage of the functionality with the defined tests. In some cases, such threshold value can be 80%. In the example from FIG. 2B, if the accumulated coverage of the proposed combinations is analyzed by the 2-wise technique, the number of the tests that should be implemented is 18. It can be appreciated that this can optimize the generation and execution of tests from a test suite that is defined according to the N-wise design technique. Such implementations can lead to improved efficiency without compromising the coverage of the test execution over the functionality of the data processing application.

However, the use of an N-wise design technique relies on a definition of test cases for the input parameters and analyzing the result outputs only based on a guided execution of the test cases. The user is provided with the input values to generate a result that is to be evaluated. This is a downside of this strategy, as it relies on the input parameters and does not target to evaluate the behavior of the user when interacting with the data processing application to reach a particular goal, such as to obtain a particular output. As described in the present application, a reverse N-wise technique can be used to test an application (e.g., in the context of exploratory testing or black-box testing) to compensate for the downsides of the N-wise design technique, and to improve the test coverage by focusing the testing on the user perspective and specific usage of a data processing application to achieve desired results.

In some implementations, a reverse N-wise design technique reverses the used parameters, and instead of using the input parameters, focuses more on the output parameters. By doing so, a user is directed to simulate what can be done to achieve a particular test output as provided as a test case for the user. In a similar way to the definition of the parameters in the N-wise technique, the reverse N-wise technique can be defined based on the following parameters as presented at Table 3 below.

TABLE 3

Data Provider = {Purchase Order Date, Customers, Products, Country}
Supported Operators = {Equal, greater than, less than, include, exclude, none}
All Member = {True, false}

For example, the data associated with the different parameters can include data as shown in Table 4.

TABLE 4

Purchase Orders = {2009/02/17, 2020/09/27, 2015/11/10, 2013/05/02, ...}
Customers = {Customer001, Customer002, Customer003, ..., Customer008}
Products = {Product001, Product002, Product003, Product004, Product005}
Country = {Afghanistan, Albania, Algeria, Andorra, ...}

In some cases, by analyzing the input parameters, equivalence classes can be built and used for generation of test by the N-wise technique as shown in Table 5.

TABLE 5

Purchase Orders Years={2009, 2010, 2011, 2012, ..., 2022}
Purchase Orders Months= {01, 02, 03, 04, ..., 12}
Purchase Orders Days= {01, 02, 03, 04, ..., 31}
Customers.TOP1 = {Customer001, Customer006, Customer008}
Customers.TOP2 = {Customer003, Customer004, Customer007}
Customers.TOP3 = {Customer002, Customer005}
Products.Category1 = {Product001, Product002}
Products.Category2 = {Product003, Product004, Product005}
Country. Europe = {France, Albania, Andorra, Spain}
Country. Asia={Afghanistan, China, Japan}
Country. Africa = {Algeria, South Africa}

Based on the values for input parameters as shown in Table 5, the number of possible tests can be determined. The number of possible tests is 26853120 that represent the different valid combinations of values that can be assigned to the parameters in the parameter definition. This number grows rapidly as more parameters and values are added to the parameter definition. For parameter definitions with many parameters and values, this number might be extremely large, or the calculation of the number might time out. Further, the number of valid combinations is 2594. For example, in the case of two parameters, Parameter 1 with values A and B and Parameter 2 with values C and D, the valid combinations of 2 values are: {A, C}, {A, D}, {B, C} and {B, D}. In this case, the combinations {A, B} and {C, D} are invalid combinations as each parameter can only have one value assigned to it.

Figure 4:
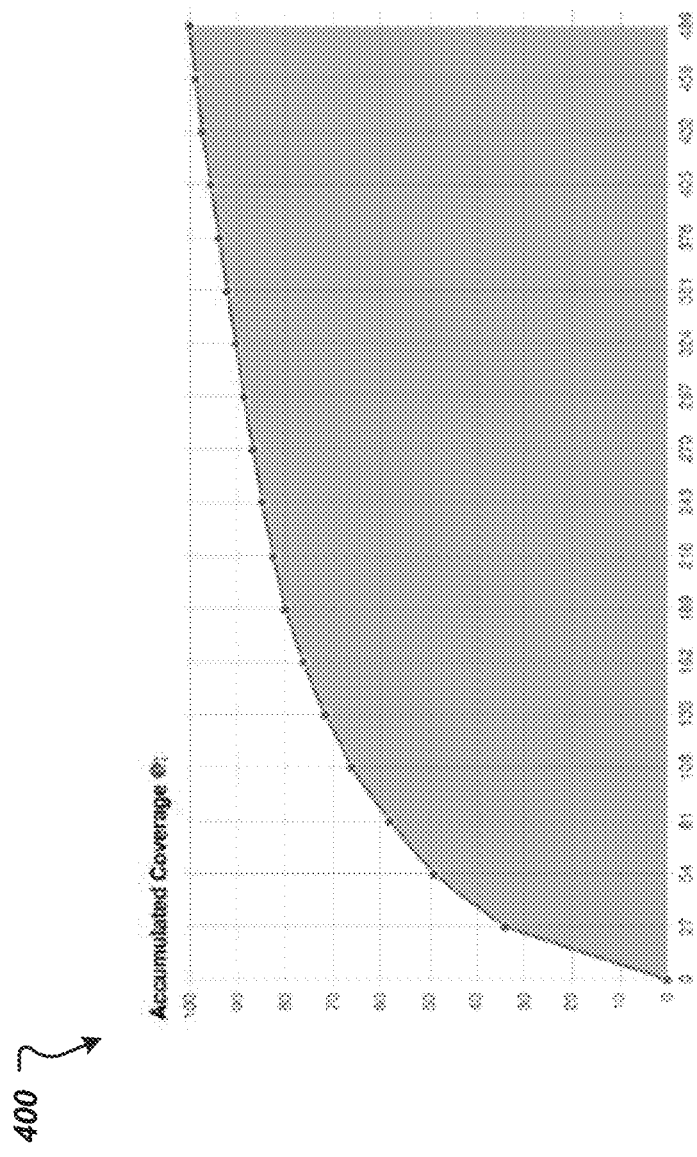
FIG. 4 is a diagram showing an example accumulated coverage that can be obtained by generating test case scenarios according to a 2-Wise design technique that can be used by a test generator.

FIG. 4 presents an example accumulated coverage 400 that can be obtained by generating test case scenarios according to a 2-Wise design technique that can be used by a test generator. As shown, the 80% coverage can be reached with the first 189 test cases.

Pushing the model as defined at Table 1 and Table 2 through a 2-wise test generator will provide 486 test cases.

Figure 3:
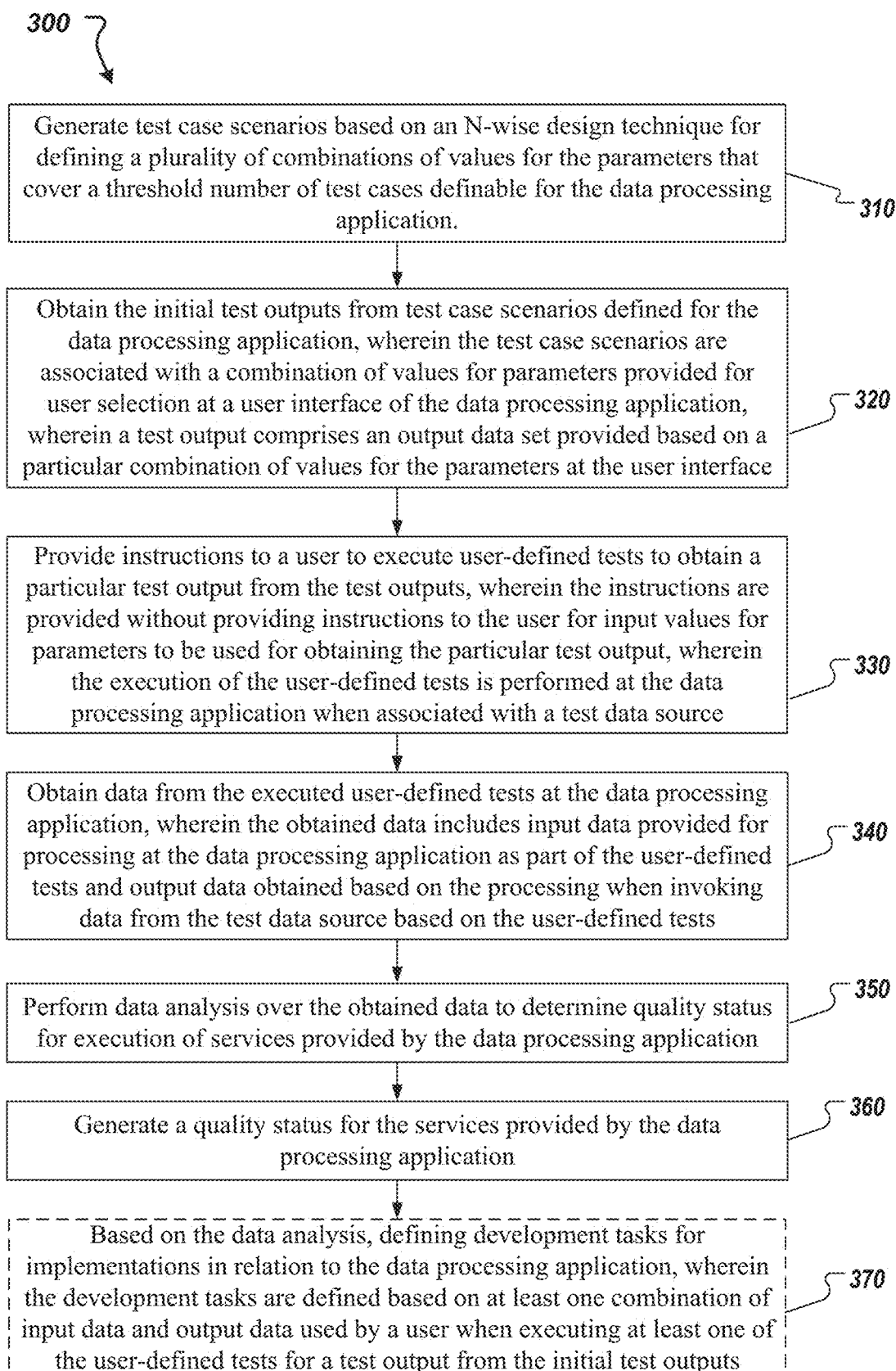
FIG. 3 is a flow diagram of a method for executing reverse testing strategies designed for black-box and/or exploratory testing in accordance with implementations of the present disclosure.

In some instances, the defined test cases can be used to be executed at the data processing application as described in relation to FIGS. 1, 2, and 3. The test cases can be executed and test outputs can be obtained. The test outputs can be used for reverse N-wise testing and providing the outputs as instructions to users, to perform further test cases without providing them instructions for the input parameters. For example, the reverse N-wise testing can be executed as further described in relation to method 300 of FIG. 3.

In some implementations, an analytical and reporting solution platform can use stored data in a data storage (e.g., data warehouse) to build reports (e.g., in form of dashboards) with charts and tables. The reports can be provided through a user interface (UI). In some cases, a software development kit (SDK) can be built in addition to the user interface to allow the users to build reports with development tools instead of the already available UI. The SDK can take input values such as:
  Actions (create, save, delete, add, update, open, refresh, etc.)
  Resources (Dashboard, table, chart, data source, etc.)
  Details (Dashboard filter, chart colors, data source dimensions, table size, etc.).

The output that can be generated based on interaction with the SDK can be a dashboard built on top of a data source from the resources that includes charts and tables.

During an initial testing process of the analytical and reporting solution platform, the platform can be tested using traditional N-wise testing techniques to ensure comprehensive coverage of the input combinations. However, after the platform is deployed and provided to users for generating reports, the users may report issues related to inaccurate behaviors when using the SDK (issues while saving, dashboards not being in conformity to build instruction, etc.). If a reverse N-wise testing is performed based on output-based parameters, dashboards already created with the UI with a specific combination of output values can be used and provided to testers (or quality assurance team). In some instances, used resources and details as part of already generated dashboards can be specified. These dashboards can be obtained from already defined test scenarios and/or from user specific scenarios. The N-Wise design technique was not performed on the SDK but on the generated dashboards.

When executing the reverse N-wise testing, instruction can be given to the users to replicate the exact same dashboard using the SDK, or instead of creating the dashboard from scratch using the already provided UI dashboard to complete the testing workflows. By applying reverse N-wise testing, specific combinations of output values that indicate issues in the system of a particular user that is associated with the testing can be identified.

FIG. 3 is a flow diagram of a method 300 for executing reverse testing strategies designed for black-box and/or exploratory testing in accordance with implementations of the present disclosure. The method 300 can be executed in relation to a data processing application as discussed in FIGS. 1 and 2. The execution of the reverse tests can be performed at a customer environment and the data from the executions can be obtained and analyze to identify quality issues of the data processing application and/or to define further development tasks for updating or upgrading the data processing application based on insight from the executed reverse tests (e.g., if interpreted as implicit feedback for designed functionality or way of handling tasks and actions at the data processing application).

At 310, test case scenarios are generated for a data processing application based on an N-wise design technique for defining a plurality of combinations of values for the parameters that cover a threshold number of test cases definable for the data processing application. In some cases, the data sources associated with the data processing application from which data is obtained for executing test or other executions of scenarios or tasks are associated with different configurations, settings, languages, or other local specifics (e.g., to the environment where the data process application is used or invoked as a service).

In some instances, the test case scenarios based on an N-wise design technique are defined to include a plurality of combinations of values for the parameters that cover a threshold number of test cases definable for the data processing application, for example, as discussed in relation to FIGS. 2A, 2B, and 4. For example, an initial test case scenario that is defined based on the N-wise design technique can define a combination of values for parameters provided for user selection at a user interface of the data processing application. In some cases, a test output includes an output data set that is provided based on a particular combination of values for the parameters.

At 320, the initial test outputs from test case scenarios defined for the data processing application are obtained. In some instances, the obtaining of the test outputs can be performed at a component that is different from the component or environment where the test outputs are generated themselves. In some other instances, the test outputs may be generated in other ways rather than through actual execution at the data processing application. For example, the test outputs may be generated based on simulated or predicted result generation. In some instances, the test outputs can be defined based on analyzing data from executed test cases and defining test outputs specifically for testing that may not or may exactly match with actual generated test outputs from real test executions.

At 330, instructions to users are provided. The instructions are to execute user-defined tests to obtain the test outputs. The instructions does not include instructions to the users for input values for parameters to be used for the user-defined tests. The execution of the user-defined tests can be performed at the data processing application when associated with a test data source (e.g., customer data source of the user).

At 340, data from the executed user-defined tests at the data processing application is obtained. The obtained data includes input data provided for processing at the data processing application as part of the user-defined tests and output data obtained based on the processing when invoking data from the test data source based on the user-defined tests.

At 350, data analysis is performed over the obtained data to evaluate quality of executions of services provided by the data processing application. In some instances, the evaluation of the service executions can be used to determine a quality status for the execution that can be used to define further test cases or development implementation tasks for improvement of the services.

At 360, a quality status for the services provided by the data processing application is generated. The quality status is generated to include at least one more further test input for a test case scenario to be executed over the data processing application. In some instances, the further test input can be based on a particular service execution associated with lower quality performance and/or associated with identified quality issues such as security breaches, performance delays, or wrong or incomplete output, among other example quality considerations. In some instances, the generated test input can be directly used for new feature development, for example, using test-driven development techniques.

At 370, optionally, and based on the data analysis and the quality status, development tasks for implementations in relation to the data processing application can be defined. In some other cases (now shown), further test cases and/or test outputs for testing can be defined. In the case of defining development tasks, those tasks can be defined based on at least one combination of input data and output data used by a user when executing at least one of the user-defined tests for a test output from the initial test outputs.

In some instances, the execution of reverse tests and the data collection can be incorporated into further development and/or testing phases relevant for the application. For example, the reverse tests can be performed by selecting specific combinations of output values that describe final dashboards as outputs and providing instructions to users on replicating those outputs.

For example, in the context of the above discussed example where an SDK is built in addition to the UI to support dashboard generation, the users may be asked to replicate outputs using the SDK. In those cases, the users can follow the instructions and attempt to recreate the same output values using the SDK. The user actions associated with the recreation of the output can be monitored and tracked. Data can be collected during the execution of the reverse test, where various aspects such as user actions, interactions with the SDK, and resulting output values can be tracked at each step. The collected data can include information about the actions performed (e.g., creating, saving, deleting), the resources used (e.g., dashboards, tables, charts), and the details (e.g., properties such as color, dimensions, size). In some instances, the collected data can be in the form of logs, user interactions, and API calls, and can include details of the user executing the SDK call and time stamp related to the action. The collected logs can be stored in JLog files within a server hosting the SDK service or at a suitable data storage system. The stored data can be processed and analyzed to gain insights into the quality and behavior of the SDK. Data processing may involve cleaning the data, transforming it into a suitable format, and aggregating relevant information. In some instances, a tool can be developed to perform data logs interpretation. In some instances, the tool can implement data analysis techniques to identify patterns, trends, anomalies, and potential issues or defects in the SDK's behavior. Further, the techniques can help improve the performance, the security, and the global quality of the solution.

In some instances, based on analysis of the collected data from executed reverse tests, issues or problems can be prioritized for fixing or further investigation. For example, as described in the above examples, detected issues can result in definition of future feature implementations such as refinement of the SDK, adjusting the testing strategies for subsequent phases, ensuring more thorough coverage (e.g., number of tests to be executed) and targeted testing of critical areas.

In some instances, when analyzing data obtained after the execution of user-defined tests based on the reverse testing technique, several issues, including security breaches, can be identified. For example, the below listed possible issues related to security can be uncovered through data analysis 1) Unauthorized Access: By analyzing user actions and resource usage, it may be possible to detect instances of unauthorized access to sensitive data or functionalities. For example, if a user's actions indicate that it was possible to access privileged information or perform restricted operations without proper authorization, a security breach can be identified.
2) Data Leakage: Data analysis can help identify instances of data leakage where sensitive information is unintentionally exposed. By examining the output values generated by users during reverse tests, any unexpected or unintended disclosure of confidential data can be detected. For example, again using our previous example, updating a filter on an already created dashboard with a different user profile or exporting it through the SDK can be identified as a Data Leakage.

In some instances, data processing to determine the quality of an application in the context of testing and functionality evaluation can involve analyzing the input values provided by users during reverse tests. Such analyses can include checking for valid and invalid inputs, boundary values, and edge cases. While this can be easily checked for the input parameters testing, testing for these for the output parameters is very different as the user needs to craft specific tests in order to check the boundary values of the output parameters. Thus, testing based on output parameters can support the testing based on input parameters by expanding the test coverage over scenarios that may not be defined using the standard N-wise techniques on input parameters. Data processing includes categorizing the input values and generated output results by the user into different functional areas or features. This analysis helps assess the coverage of functionality within the application. By examining the distribution of input values and corresponding output results, testing users can identify any areas of functionality that are under-tested or require further attention. The focus of the testing can be on the customer-specific environment constraints and towards the needed results (the output of the application), rather that the possible values that a system can handle as input. Trying to replicate an output of a software using the reverse N-wise test technique can be associated with uses cases that often lead to error messages or exception, where analyzing and processing such errors or issues can help identify common error scenarios and the application's behavior when errors occur. By examining the frequency and types of errors, testing executions and data analysis can support identifying areas of the application that require improved error handling and exception management.

Figure 5:
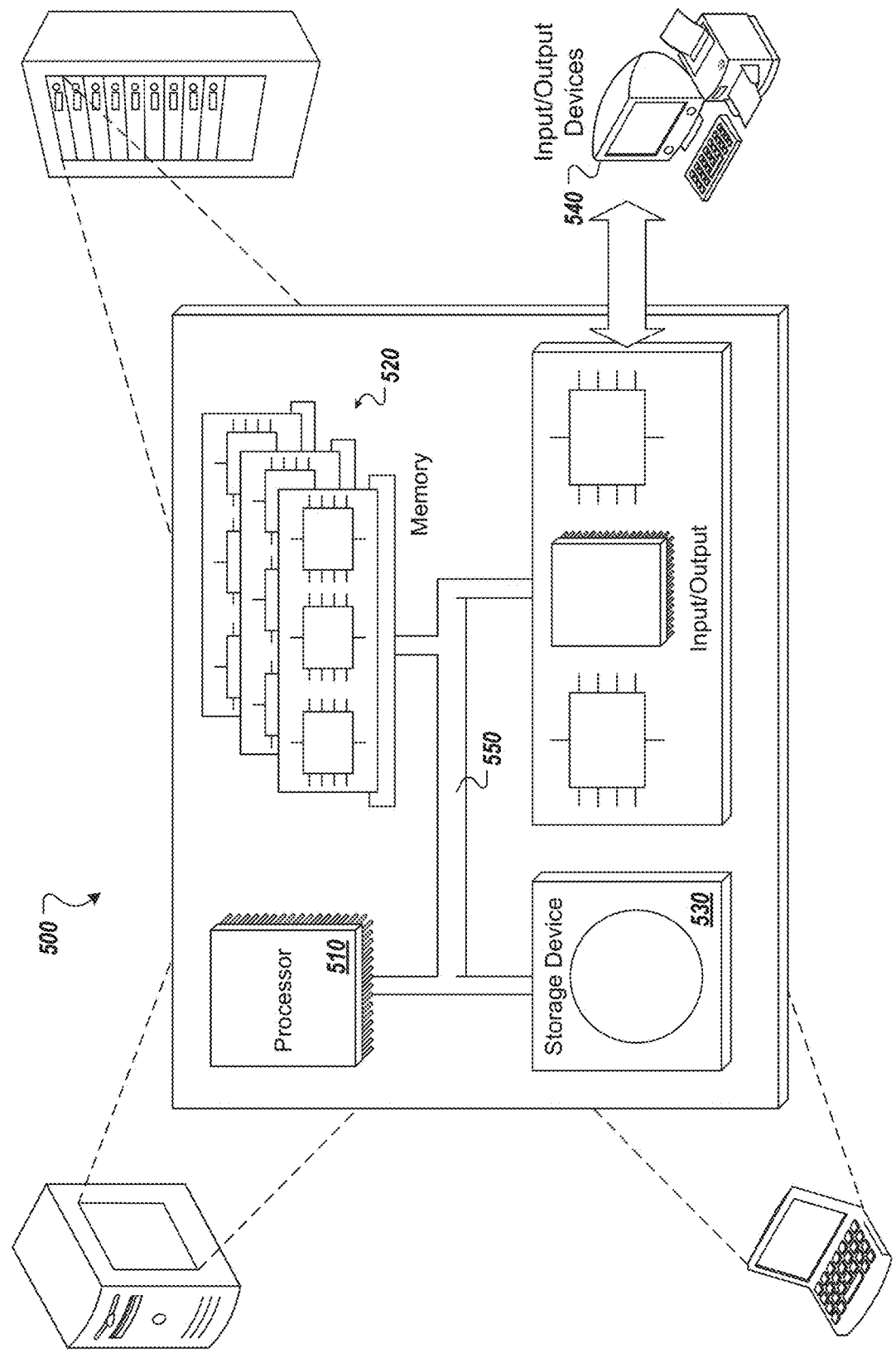
FIG. 5 is a schematic diagram of an example computer system that can be used to execute implementations of the present disclosure.

FIG. 5 is a schematic diagram of an example computer system 500 that can be used to execute implementations of the present disclosure. For example, the computer system 500 may be included in any or all of the server components discussed herein. The computer system 500 includes a processor 510, a memory 520, a storage device 530, and an input/output device 550. The components 510, 520, 530, and 550 are interconnected using a system bus 550. The processor 510 is capable of processing instructions for execution within the computer system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 550.

The memory 520 stores information within the computer system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 550 provides input/output operations for the computer system 500. In some implementations, the input/output device 550 includes a keyboard and/or pointing device. In some implementations, the input/output device 550 includes a display unit for displaying graphical user interfaces.

The features described can be implemented in digital electronic circuitry, or in computer hardware, firmware, software, or combinations of them. The apparatus can be implemented in a computer program product tangibly embodied in an information carrier (for example, in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or another unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory, or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as sPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship between client and server arises by virtue of computer programs running on the respective computers and having a client-server relationship with each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter, this application discloses the following list of examples, wherein one feature of an example in isolation or more than one feature of said example taken in combination and, optionally, in combination with one or more features of one or more further examples are further examples also falling within the disclosure of this application.

Examples

Although the present application is defined in the attached claims, it should be understood that the present invention can also be (alternatively) defined in accordance with the following examples:

Example 1. A computer-implemented method comprising:
obtaining initial test outputs from test case scenarios defined for the data processing application, wherein the test case scenarios are associated with a combination of values for parameters provided for user selection at a user interface of the data processing application, wherein a test output comprises an output data set provided based on a particular combination of values for the parameters at the user interface;
providing instructions to a user to execute user-defined tests to obtain a particular test output from the test outputs, wherein the instructions are provided without providing instructions to the user for input values for parameters to be used for obtaining the particular test output, wherein the execution of the user-defined tests is performed at the data processing application when associated with a test data source;
obtaining data from the executed user-defined tests at the data processing application, wherein the obtained data includes input data provided for processing at the data processing application as part of the user-defined tests and output data obtained based on the processing when invoking data from the test data source based on the user-defined tests;
performing data analysis over the obtained data to evaluate quality of executions of services provided by the data processing application; and
generating a quality status for the services provided by the data processing application, wherein the quality status is generated to include at least one more further test input for a test case scenario to be executed over the data processing application.

Example 2. The method of Example 1, further comprising:
based on performing the data analysis, identifying a security breach in at least one service of the services provided by the data processing application during execution of at least one of the executed user-defined tests to generate a test output by the user.

Example 3. The method of any one of the preceding Examples, the method comprising:
generating the test case scenarios based on an N-wise design technique for defining a plurality of combinations of values for the parameters that cover a threshold number of test cases definable for the data processing application.

Example 4. The method of Example 3, further comprising:
generating the initial test outputs from executing the test case scenarios at the data processing application when accessing data from a plurality of data sources, wherein at least two data sources from the plurality of data sources are associated with different localization configurations.

Example 5. The method of Example 4, wherein a set of input values for the parameters used by a user for a first user-defined test differs from combination of input values for the parameters used as input for performing the test case scenarios to generate the initial test outputs.

Example 6. The method of Example 1, wherein a configuration of the data processing application when accessing data from the test data source differs from a configuration of the data processing application when used for executing a user-defined test to obtain a test output of the test outputs.

Example 7. The method of any one of the preceding Examples, further comprising:
based on the data analysis, defining development tasks for implementations in relation to the data processing application, wherein the development tasks are defined based on at least one combination of input data and output data used by a user when executing at least one of the user-defined tests for a test output from the initial test outputs.

Example 8. The method of any one of the preceding Examples, 1 further comprising:
executing the user-defined tests at multiple instances of the data processing application, wherein at least two of the instances are associated with different data sources to be used as a test data source for invoking the data.

Example 9. A system comprising:
one or more processors; and
one or more computer-readable memories coupled to the one or more processors and having instructions stored thereon that are executable by the one or more processors to perform the method of any of Examples 1 to 8.

Example 10: A non-transitory, computer-readable medium coupled to one or more processors and having instructions stored thereon which, when executed by the one or more processors, cause the one or more processors to perform the method of any of Examples 1 to 8.

What is claimed is:

1. A computer-implemented method for quality testing of a data processing application, the method comprising:
obtaining initial test outputs from test case scenarios defined for the data processing application, wherein the test case scenarios are associated with a combination of values for parameters provided for user selection at a user interface of the data processing application, wherein an initial test output comprises an output data set provided based on a particular combination of values for the parameters at the user interface;
providing instructions to a user to execute user-defined tests to obtain a particular test output from the initial test outputs, wherein the instructions are provided without providing instructions to the user for input values for the parameters to be used for obtaining the particular test output, wherein execution of the user-defined tests is performed at the data processing application when associated with a test data source;
in response to completing the execution of the user-defined tests at the data processing application, obtaining data from the executed user-defined tests at the data processing application, wherein the obtained data includes (i) test input data provided for requesting the user-defined tests to be executed at the data processing application and (ii) the particular test output obtained based on processing the user-defined test based on the test input data and invoking data from the test data source according to the user-defined tests;
performing data analysis over the obtained data to evaluate quality of executions of services provided by the data processing application;
generating a quality status for the services provided by the data processing application; and
generating a new test case scenario for automated execution, wherein the new test case scenario is generated based on the quality status so that the new test case scenario includes first test input for triggering the execution of the new test case scenario at the data processing application.

2. The method of claim 1, further comprising:
based on performing the data analysis, identifying a security breach in at least one service of the services provided by the data processing application during execution of at least one of the executed user-defined tests to generate a test output by the user.

3. The method of claim 1, the method comprising:
generating the test case scenarios based on an N-wise design technique for defining a plurality of combinations of values for the parameters that cover a threshold number of test cases definable for the data processing application.

4. The method of claim 3, further comprising:
generating the initial test outputs from executing the test case scenarios at the data processing application when accessing data from a plurality of data sources, wherein at least two data sources from the plurality of data sources are associated with different localization configurations.

5. The method of claim 4, wherein a set of input values for the parameters used by a user for a first user-defined test differs from combination of input values for the parameters used as input for performing the test case scenarios to generate the initial test outputs.

6. The method of claim 1, wherein a configuration of the data processing application when accessing data from the test data source differs from a configuration of the data processing application when used for executing a user-defined test to obtain a test output of the test outputs.

7. The method of claim 1, further comprising:
based on the data analysis, defining development tasks for implementations in relation to the data processing application, wherein the development tasks are defined based on at least one combination of a piece of test input data and a corresponding test output data used by the user when executing at least one of the user-defined tests for a test output from the initial test outputs.

8. The method of claim 1, further comprising:
executing the user-defined tests at multiple instances of the data processing application, wherein at least two of the instances are associated with different data sources to be used as the test data source for invoking the data.

9. A system comprising:
one or more processors; and
one or more computer-readable memories coupled to the one or more processors and having instructions stored thereon that are executable by the one or more processors to perform operations comprising:
obtaining initial test outputs from test case scenarios defined for a data processing application, wherein the test case scenarios are associated with a combination of values for parameters provided for user selection at a user interface of the data processing application, wherein an initial test output comprises an output data set provided based on a particular combination of values for the parameters at the user interface;
providing instructions to a user to execute user-defined tests to obtain a particular test output from the initial test outputs, wherein the instructions are provided without providing instructions to the user for input values for the parameters to be used for obtaining the particular test output, wherein execution of the user-defined tests is performed at the data processing application when associated with a test data source;

in response to completing the execution of the user-defined tests at the data processing application, obtaining data from the executed user-defined tests at the data processing application, wherein the obtained data includes (i) test input data provided for requesting the user-defined tests to be executed at the data processing application and (ii) the particular test output obtained based on processing the user-defined test based on the test input data and invoking data from the test data source according to the user-defined tests;

performing data analysis over the obtained data to evaluate quality of executions of services provided by the data processing application;

generating a quality status for the services provided by the data processing application; and generating a new test case scenario for automated execution, wherein the new test case scenario is generated based on the quality status so that the new test case scenario includes first test input for triggering the execution of the new test case scenario at the data processing application.

10. The system of claim 9, wherein the one or more computer-readable memories store instructions which when executed by the one or more processors perform operations comprising:

based on performing the data analysis, identifying a security breach in at least one service of the services provided by the data processing application during execution of at least one of the executed user-defined tests to generate a test output by the user.

11. The system of claim 9, wherein the one or more computer-readable memories store instructions which when executed by the one or more processors perform operations comprising:

generating the test case scenarios based on an N-wise design technique for defining a plurality of combinations of values for the parameters that cover a threshold number of test cases definable for the data processing application.

12. The system of claim 11, wherein the one or more computer-readable memories store instructions which when executed by the one or more processors perform operations comprising:

generating the initial test outputs from executing the test case scenarios at the data processing application when accessing data from a plurality of data sources, wherein at least two data sources from the plurality of data sources are associated with different localization configurations.

13. The system of claim 12, wherein a set of input values for the parameters used by a user for a first user-defined test differs from combination of input values for the parameters used as input for performing the test case scenarios to generate the initial test outputs.

14. The system of claim 9, wherein a configuration of the data processing application when accessing data from the test data source differs from a configuration of the data processing application when used for executing a user-defined test to obtain a test output of the test outputs.

15. A non-transitory, computer-readable medium coupled to one or more processors and having instructions stored thereon which, when executed by the one or more processors, cause the one or more processors to perform operations comprising obtaining initial test outputs from test case scenarios defined for a data processing application, wherein the test case scenarios are associated with a combination of values for parameters provided for user selection at a user interface of the data processing application, wherein an initial test output comprises an output data set provided based on a particular combination of values for the parameters at the user interface;

providing instructions to a user to execute user-defined tests to obtain a particular test output from the initial test outputs, wherein the instructions are provided without providing instructions to the user for input values for the parameters to be used for obtaining the particular test output, wherein execution of the user-defined tests is performed at the data processing application when associated with a test data source;

in response to completing the execution of the user-defined tests at the data processing application, obtaining data from the executed user-defined tests at the data processing application, wherein the obtained data includes (i) test input data provided for requesting the user-defined tests to be executed at the data processing application and (ii) the particular test output obtained based on processing the user-defined test based on the test input data and invoking data from the test data source according to the user-defined tests;

performing data analysis over the obtained data to evaluate quality of executions of services provided by the data processing application;

generating a quality status for the services provided by the data processing application; and generating a new test case scenario for automated execution, wherein the new test case scenario is generated based on the quality status so that the new test case scenario includes first test input for triggering the execution of the new test case scenario at the data processing application.

16. The non-transitory, computer-readable medium of claim 15, further storing instructions, which when executed by the one or more processors, cause the one or more processors to perform operations comprising:

based on performing the data analysis, identifying a security breach in at least one service of the services provided by the data processing application during execution of at least one of the executed user-defined tests to generate a test output by the user.

17. The non-transitory, computer-readable medium of claim 15, further storing instructions, which when executed by the one or more processors, cause the one or more processors to perform operations comprising:

generating the test case scenarios based on an N-wise design technique for defining a plurality of combinations of values for the parameters that cover a threshold number of test cases definable for the data processing application.

18. The non-transitory, computer-readable medium of claim 17, wherein the one or more computer-readable memories store instructions which when executed by the one or more processors perform operations comprising:

generating the initial test outputs from executing the test case scenarios at the data processing application when accessing data from a plurality of data sources, wherein at least two data sources from the plurality of data sources are associated with different localization configurations.

19. The non-transitory, computer-readable medium of claim 18, wherein a set of input values for the parameters used by a user for a first user-defined test differs from combination of input values for the parameters used as input for performing the test case scenarios to generate the initial test outputs.

20. The non-transitory, computer-readable medium of claim 15, wherein a configuration of the data processing application when accessing data from the test data source differs from a configuration of the data processing application when used for executing a user-defined test to obtain a test output of the test outputs.

* * * * *